May 26, 1959 W. S. WOLFRAM 2,888,270
STABILIZER CONTROLLED LEVELING VALVE FOR AIR SUSPENDED VEHICLE
Filed June 29, 1955
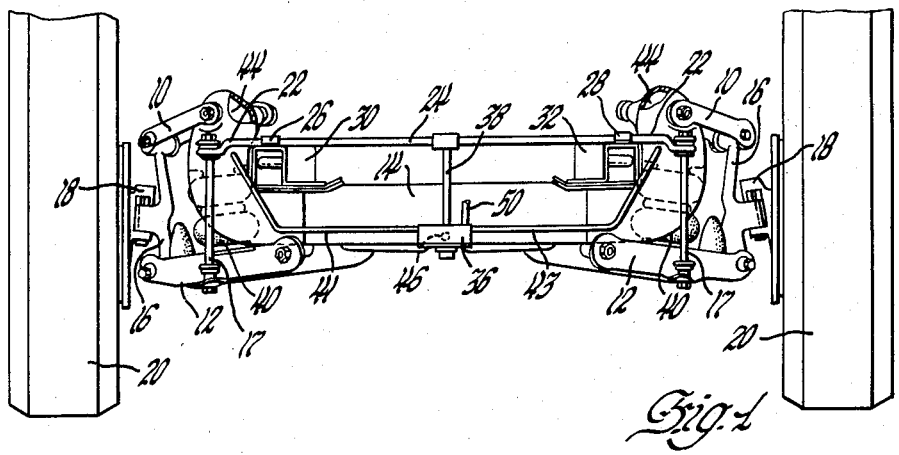
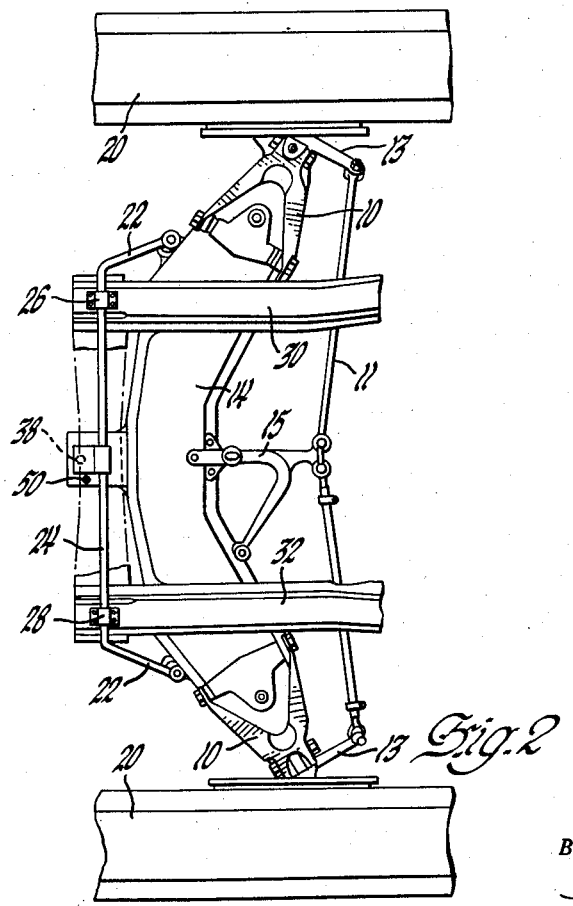
INVENTOR.
William S. Wolfram
BY
J. C. Thorpe
ATTORNEY

United States Patent Office 2,888,270
Patented May 26, 1959

2,888,270

STABILIZER CONTROLLED LEVELING VALVE FOR AIR SUSPENDED VEHICLE

William S. Wolfram, Birmingham, Mich., assignor to General Motors Corporation, Detroit, Mich., a corporation of Delaware Application June 29, 1955, Serial No. 518,915

6 Claims. (Cl. 280—124)

This invention relates to apparatus for application to automotive vehicles having independent front suspension assemblies comprising pneumatic springs and more particularly concerns apparatus whereby through control of the air pressure in the springs the front portion of the vehicle body may be maintained at a predetermined height irrespective of load. The invention assumes a vehicle including pneumatic springs at the rear end thereof and equipped at such end with a suitable leveling device operating to maintain the back portion of the vehicle body at the same predetermined height regardless of load variations. In this connection see, for example, Rossman Patent 2,670,201 granted February 23, 1954.

The installation of such a leveling device at the head end of a vehicle in which the dirigible wheels move independently of each other presents difficulties not encountered in the instance of vehicles having a single axle common to the dirigible wheels. In the latter case, the installation at the front may conform with the installation at the rear, i.e. the body of the leveling device, which is actually a valve, may be mounted on the common axle and the movable component actuated via a linkage member connecting with the frame or body of the vehicle.

Contrary to what might be expected, the installation of two leveling devices at the front, one associated with each suspension assembly, affords no solution because such devices sense only height, a condition which could have rather curious results. Thus, should the vehicle be loaded with its cargo or passengers while parked with one of the front wheels on a high curb, the posture of the body assumed during the loading would tend to hold after the vehicle had been put in motion, so that the latter would proceed down the road with the body in a canted disposition.

In accordance with the present invention, the indicated problems are met through the use of a deformable member, as a torsion bar, afforded support by the frame of the vehicle and extending transversely thereof to interconnect components of the two front suspension assemblies, which components move on spring deflection. This deformable member is connected via a lever or equivalent part to the actuating component of the leveling device, the body of which is fixed to the frame or body of the vehicle as before. The leveling valve operates to admit or release air from the pneumatic springs only on simultaneous movement of the interconnected suspension components in the same direction. In the event the interconnected components move oppositely the deformable member deforms thereby to prevent actuation of the leveling device.

It should be understood that the leveling devices or valves herein contemplated operate only during loading and unloading, when the contraction or expansion of the springs is slow and generally progressive. The variations in body height incident to spring deflection with the vehicle in motion have substantially no effect on the leveling device.

With the foregoing as an introduction, the invention will be specifically described in terms of the preferred embodiment thereof illustrated by the accompanying drawings in which Figure 1 is a front elevation and Figure 2 a plan.

The suspension assemblies shown are of the familiar wishbone type each involving upper and lower control arms 10 and 12 pivotally connected to cross frame member 14. At either side of the vehicle the corresponding upper and lower control arms are interconnected by a steering knuckle support 16, in turn connected via the usual king pin to a steering knuckle 18. The wheels 20 are turned about the steering knuckles by any suitable type of steering linkage, that shown (Fig. 2) including tie rods 11, steering knuckle arms 13, and an idler arm assembly 15 to which the inner ends of the tie rods are connected.

Extending upwardly from each lower control arm 14 is a rod 17, these rods being attached at their upper ends to the crank portions 22 of a torsion bar 24, hingedly supported at 26 and 28 by the side rails 30 and 32 of the vehicle frame.

Cross frame member 14 carries substantially centrally of its length, the body portion 36 of a leveling valve which may conform, with advantage, to the valve disclosed in the previously mentioned Rossman Patent 2,670,201. In view of the full and complete description provided by such patent, detailed discussion of the valve is not considered necessary here. Suffice it to say that the valve is actuated via a link 38 extending upwardly to a fixed connection with the torsion bar 24, the connection being made at a point substantially centrally of the length of the torsion bar.

With the arrangement as described and illustrated, it should be clear, considering the crank portions 22 of the torsion bar, that on simultaneous movement of the dirigible wheels 20, either up or down, link 38 will be rocked in a direction longitudinal of the vehicle to actuate the leveling device.

Each of the suspension assemblies comprises a pneumatic spring 40 open to an individual air reservoir or chamber 44 forming a part of the cross frame member 14. The air reservoirs are interconnected through the leveling valve via conduits 41 and 43. A conduit indicated at 46 leads to a source of air supply, not shown.

It will be understood that spring deflection occurring with the vehicle in motion is marked by exchange of air between the bellows 40 and the corresponding air chambers 44.

During loading of the vehicle, the progressively increasing weight on the springs results in rocking of the link 38 in a forward direction with admission of air through the leveling valve to the springs, so that the vehicle body, including the frame of the vehicle, does not drop to a level below that which has been predetermined by the setting or adjustment of the leveling device. Conversely, on unloading of the vehicle, line 38 is rocked in a rearward direction and air is withdrawn from the springs through the vent 50, preventing the vehicle body from attaining a height above the selected level.

The action of the leveling valve as just explained presupposes that the wheels 20 during the loading or unloading are disposed substantially coaxially, i.e. in substantially the same horizontal plane. Otherwise, the leveling valve will be ineffective since torsion bar 24 will not rock on its hinge points as necessary to move the link 38, but will twist axially. That the twisting action will not cause any substantial movement of the link will be clear when it is considered that upward movement of the vehicle body at one side, resulting in twisting of the torsion bar, will necessarily be accompanied by downward movement of the body at the other side causing the torsion bar at such side to twist oppositely, neutralizing the twisting at the mid-point of the bar where the link is connected.

It is believed evident that the construction herein answers fully to the objects of the invention, and that the same is readily adapted for practical application due to its simplicity and obviously low cost.

I claim:

1. In an automotive vehicle having independent front suspension assemblies, each assembly including an air spring, the combination of a source of air pressure, a member afforded support by the frame of the vehicle and extending transversely of the vehicle, said member terminating at its ends in crank portions, each such portions being linked to a component of the assembly at the corresponding side of the vehicle which component moves on spring deflection, and a leveling valve controlling air flow to and from said springs, said valve comprising a part having fixed connection with said frame and an actuating part connected to said member at a point mediate said assemblies, said member being characterized in operation in that on movement of one of the said components only it compensates for such movement without moving said actuating part by deforming and in that on simultaneous movement of said components it moves without substantial deformation to actuate said actuating part.

2. In an automotive vehicle having independent front suspension assemblies, each assembly including an air spring, the combination of a source of air pressure, a torsion member hingedly connected to the vehicle frame transversely thereof, said member terminating at its ends in crank portions linked at the corresponding sides of the vehicle to equivalent components of the two assemblies which move on spring deflection, the body of said member being spaced longitudinally from its points of connection with said components, and a leveling valve controlling air flow to and from said springs, said valve comprising a part having a fixed connection with said frame and an actuating part connected to said member at a point mediate said assemblies.

3. In an automotive vehicle having independent front suspension assemblies, each assembly including an air spring, the combination of a source of air pressure, a torsion member hingedly connected to the frame of the vehicle transversely thereof, said member having a connection at either end thereof with a linkage element, these elements in turn being connected to corresponding components of the two assemblies which move on spring deflection, the body of said member between said assemblies being longitudinally spaced from its points of connection with said elements, and a leveling valve controlling air flow to and from said springs, said valve comprising a part having a fixed connection with said frame and an actuating part connected to said member at a point mediate said assemblies.

4. In an automotive vehicle having independent front suspension assemblies, each assembly including an air spring and upper and lower control arms pivotally connected to the vehicle frame, the combination of a source of air pressure, a torsion member hingedly connected to said frame transversely thereof, said member having a connection at either end thereof with a linkage element, these elements in turn being connected to corresponding components of the two assemblies which move on spring deflection, the body of said member between said assemblies being longitudinally spaced from its points of connection with said elements, and a leveling valve controlling air flow to and from said springs, said valve comprising a part having a fixed connection with said frame and an actuating part connected to said member at a point mediate said assemblies.

5. In an automotive vehicle having independent front suspension assemblies, each assembly including an air spring and upper and lower control arms pivotally connected to the vehicle frame, the combination of a source of air pressure, a torsion member hingedly connected to said frame transversely thereof, said member being connected at either end to a linkage element, these elements in turn being connected to the lower control arms of said assemblies, the body of said member between said assemblies being spaced longitudinally from its points of connection with said elements, and a leveling valve controlling air flow to and from said springs, said valve comprising a part having a fixed connection with said frame and an actuating part connected to said member at a point substantially central of the length thereof.

6. In an automotive vehicle having independent front suspension assemblies, each assembly including an air spring and upper and lower control arms pivotally connected to the vehicle frame, the combination of a source of air pressure, a torsion bar hingedly connected to the frame of the vehicle transversely thereof, said bar being conected at either end to a depending linkage element, these elements in turn being connected to the lower control arms of said assemblies, the body of said bar between said assemblies being spaced longitudinally and laterally from the points of its connection with said lower control arms whereby a pair of cranks is provided, and a leveling valve controlling air flow to and from said springs, said valve comprising a part fixed on a cross frame member substantially centrally of the length thereof and an actuating part connected to said torsion bar substantially at its mid-point.

References Cited in the file of this patent

UNITED STATES PATENTS

| | | |
|---|---|---|
| 2,653,021 | Levy | Sept. 22, 1953 |
| 2,733,934 | Muller | Feb. 7, 1956 |
| 2,757,376 | Brueder | July 31, 1956 |
| 2,788,982 | Allison | Apr. 16, 1957 |

FOREIGN PATENTS

| | | |
|---|---|---|
| 1,094,986 | France | Dec. 15, 1954 |